(12) United States Patent
Chang

(10) Patent No.: US 7,735,854 B2
(45) Date of Patent: Jun. 15, 2010

(54) RAMP BRACKET ASSEMBLY OF AIR BAG FOR VEHICLES

(75) Inventor: Jae Eun Chang, Gwangmyeong-si (KR)

(73) Assignee: Kia Motors Corporation, Seoul (KR)

( * ) Notice: Subject to any disclaimer, the term of this patent is extended or adjusted under 35 U.S.C. 154(b) by 186 days.

(21) Appl. No.: 11/966,448

(22) Filed: Dec. 28, 2007

(65) Prior Publication Data

US 2009/0102165 A1    Apr. 23, 2009

(30) Foreign Application Priority Data

Oct. 23, 2007   (KR) .................... 10-2007-0106670

(51) Int. Cl.
*B60R 21/20* (2006.01)

(52) U.S. Cl. ................. 280/728.2; 280/730.2; 280/748; 296/187.05

(58) Field of Classification Search .............. 280/728.2, 280/730.2, 748, 749; 296/1.08, 39.1, 187.05, 296/214

See application file for complete search history.

(56) References Cited

U.S. PATENT DOCUMENTS

| | | | | |
|---|---|---|---|---|
| 4,455,721 A | * | 6/1984 | Leibovitz ..................... 24/346 |
| 5,906,395 A | * | 5/1999 | Isaji et al. ................. 280/743.1 |
| 6,142,506 A | * | 11/2000 | Patel et al. ................ 280/728.2 |
| 6,254,123 B1 | * | 7/2001 | Urushi et al. ............ 280/730.2 |
| 6,502,855 B1 | * | 1/2003 | Greiner et al. ........... 280/730.2 |
| 2004/0227334 A1 | * | 11/2004 | Chausset ................. 280/730.2 |
| 2006/0061069 A1 | * | 3/2006 | McKimson ............... 280/728.3 |
| 2006/0125214 A1 | * | 6/2006 | Bertossi ................... 280/730.2 |
| 2007/0090634 A1 | * | 4/2007 | Jang et al. ................. 280/730.2 |
| 2008/0007034 A1 | * | 1/2008 | Downey et al. .......... 280/730.2 |

* cited by examiner

*Primary Examiner*—Paul N Dickson
*Assistant Examiner*—James English
(74) *Attorney, Agent, or Firm*—Morgan, Lewis & Bockius LLP

(57) ABSTRACT

A ramp bracket assembly for a vehicle air bag is configured to be mounted to an inner panel of the vehicle. The assembly includes a first ramp bracket with a first engagement portion, and a second ramp bracket with a second engagement portion removably engaged with the first engagement portion. The second engagement portion is disengaged from the first engagement portion in a vehicle impact, such that the assembly absorbs shock and guides deployment of the air bag. Alternatively, a ramp bracket for a vehicle air bag is configured to be mounted to an inner panel of the vehicle. The inner panel has an engagement groove, and the ramp bracket has an engagement portion, removably engaged into the engagement groove, and disengaged therefrom in a vehicle impact such that the bracket absorbs shock and guides deployment of the air bag.

9 Claims, 3 Drawing Sheets

RAMP BRACKET ASSEMBLY OF AIR BAG FOR VEHICLES

CROSS-REFERENCE TO RELATED APPLICATIONS

This application claims priority to Korean Application No. 10-2007-0106670, filed on Oct. 23, 2007, the disclosure of which is incorporated herein by reference.

BACKGROUND OF THE INVENTION

1. Field of the Invention

The present invention relates to a ramp bracket assembly of an air bag for vehicles.

2. Description of the Prior Art

As is generally known in the art, a curtain air bag is installed inside a roof side rail in a vehicle to protect an occupant from a side impact. A traditional curtain air bag is installed outside and just above a seam between a headlining and a trim. A guide bracket is installed below the curtain air bag to guide the deployment of the curtain air bag.

The conventional guide bracket has low shock-absorbing capability and is unable to satisfy relevant regulations regarding FMH (free motion headform) impact requirements.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A ramp bracket assembly for a vehicle air bag is configured to be mounted to an inner panel of the vehicle. The assembly includes a first ramp bracket with a first engagement portion, and a second ramp bracket with a second engagement portion removably engaged with the first engagement portion. The second engagement portion is disengaged from the first engagement portion in a vehicle impact, such that the assembly absorbs shock and guides deployment of the air bag.

The first ramp bracket may be deformed in the impact.

The first engagement portion may include first saw teeth, and the second engagement portion may include second saw teeth engaged with the first saw teeth.

Alternatively, a ramp bracket for a vehicle air bag is configured to be mounted to an inner panel of the vehicle. The inner panel has an engagement groove, and the ramp bracket has an engagement portion, removably engaged into the engagement groove, and disengaged therefrom in a vehicle impact such that the bracket absorbs shock and guides deployment of the air bag.

The ramp bracket may be deformed in the impact.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
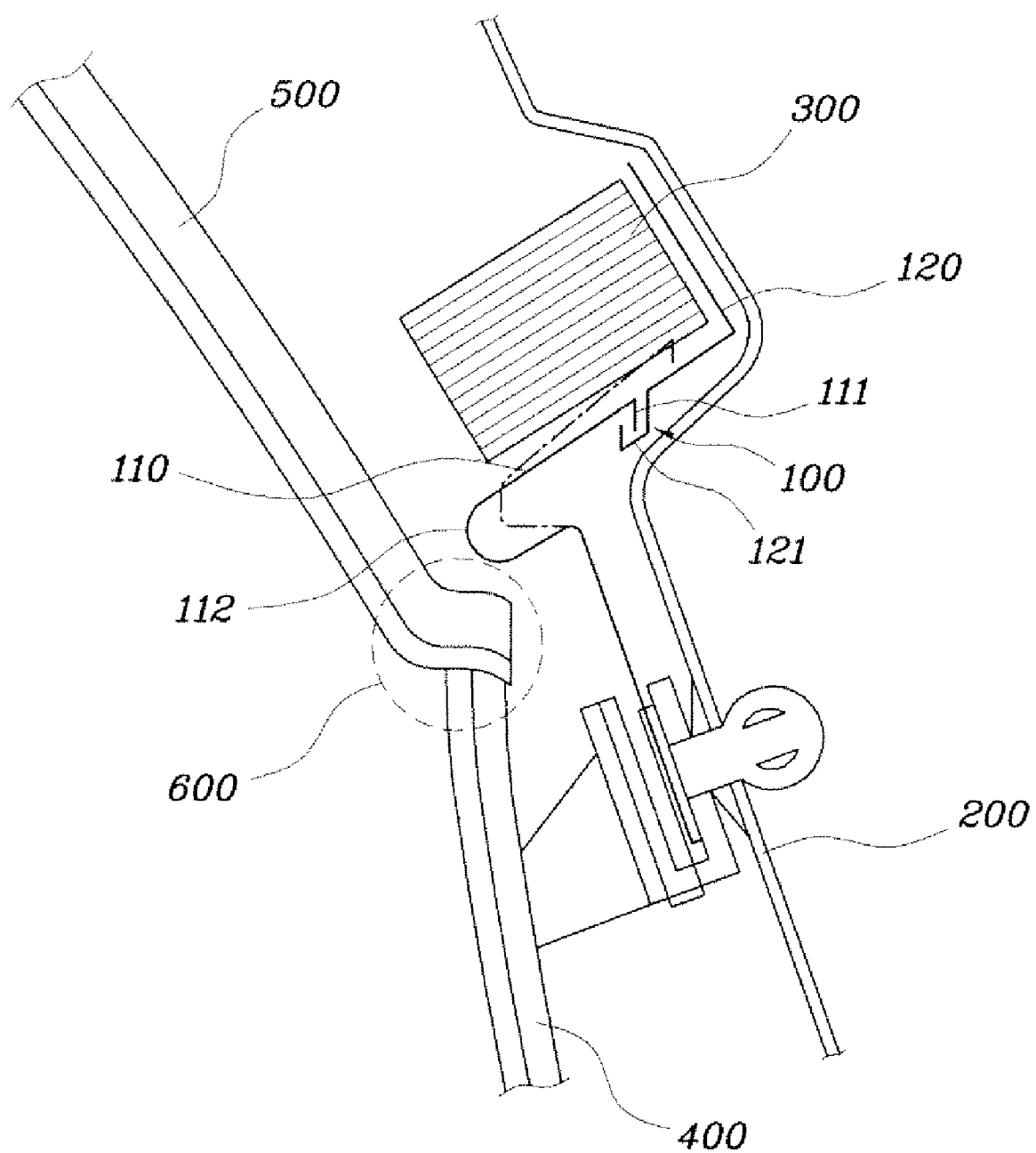
FIG. 1 is a cross-sectional view illustrating a ramp bracket assembly of an air bag for vehicles in accordance with an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Reference will now be made in detail to three preferred embodiments of the present invention, examples of which are illustrated in the accompanying drawings and described below. While the invention will be described in conjunction with exemplary embodiments, it should be understood that the description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIG. 1, a curtain air bag 300 is provided between the inner panel 200 of a vehicle and a headlining 500 to protect an occupant from an impact. A ramp bracket 100 is disposed between the inner panel 200 and a center pillar trim 400.

The ramp bracket 100 prevents the curtain air bag 300 from being pushed into the space between the inner panel 200 and the center pillar trim 400 when it inflates, and allows the curtain air bag 300 to be deployed through a seam 600 between the center pillar trim 400 and the headlining 500. Further, the ramp bracket 100 can absorb shock by being separated into two pieces when the air bag 300 inflates.

In more detail, the ramp bracket 100 includes a first ramp bracket 110, which is fastened to the portion of the inner panel 200 that faces the center pillar trim 400, and a second ramp bracket 120, which is fastened to the portion of the inner panel 200 that faces the headlining 500. The ends of the ramp brackets 110, 120 are engaged with each other near reference numeral 100 in FIG. 1.

The end of the first ramp bracket 110 has a first engagement portion 111. The end of the second ramp bracket 120 has a second engagement portion 121, which is engaged with the first engagement portion 111. The first ramp bracket 110 has a curved portion 112 near the seam 600.

When an occupant's head applies a shock to the headlining 500 in an impact, the ramp bracket 100 absorbs the shock: the first engagement portion 111 is disengaged from the second engagement portion 121, and the curved portion 112 is deformed, as shown by the phantom line in FIG. 1.

Figure 2:
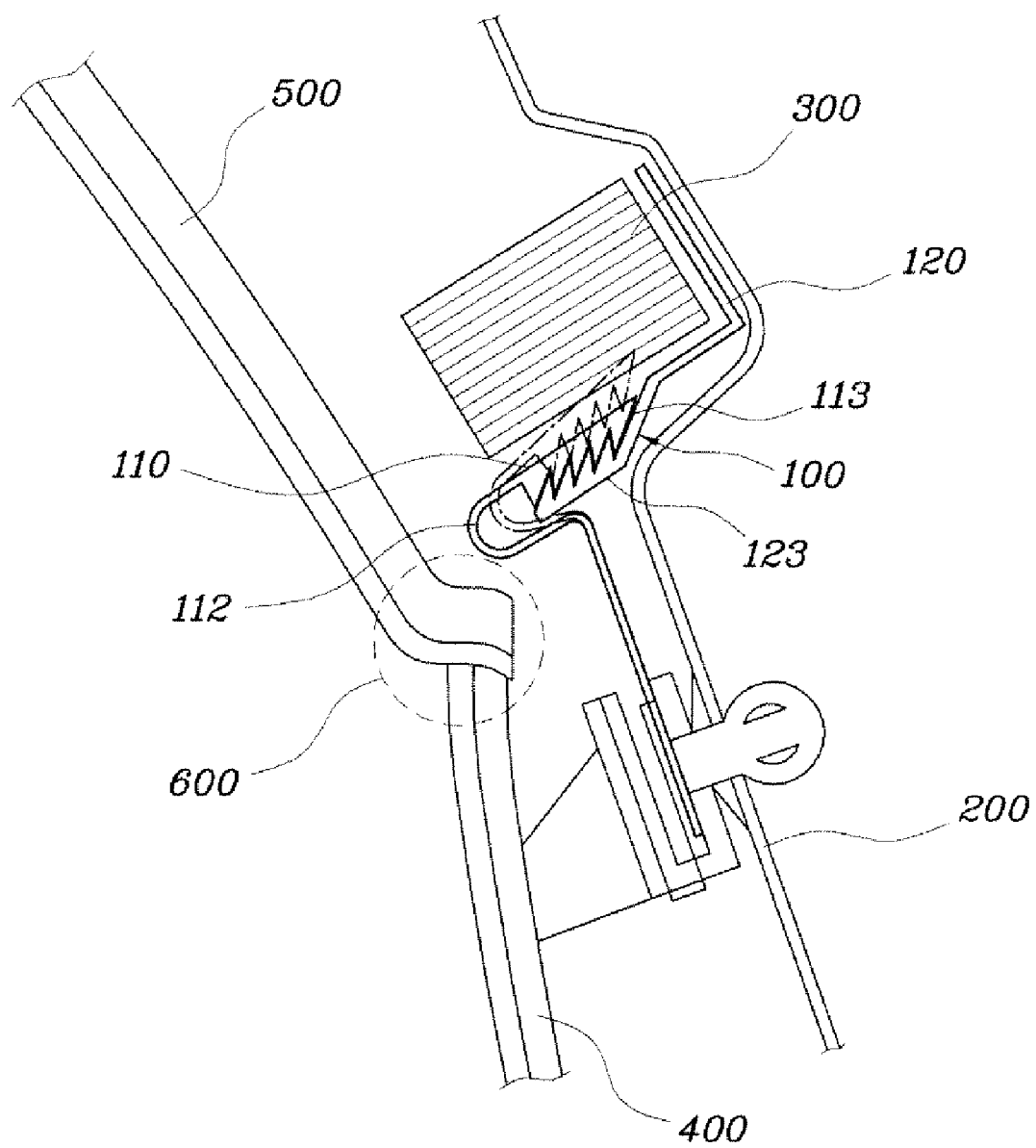
FIG. 2 is a cross-sectional view illustrating a ramp bracket assembly of an air bag for vehicles in accordance with another embodiment of the present invention.

Referring to FIG. 2, in a second exemplary embodiment, first saw teeth 113 are provided on the first ramp bracket 110. Second saw teeth 123 are provided on the second ramp bracket 120. Ordinarily, the first saw teeth 113 and the second saw teeth 123 are engaged with each other. In an impact, the ramp bracket 100 absorbs the shock: the first saw teeth 113 are disengaged from the second saw teeth 123, as shown by the phantom line in FIG. 2.

Figure 3:
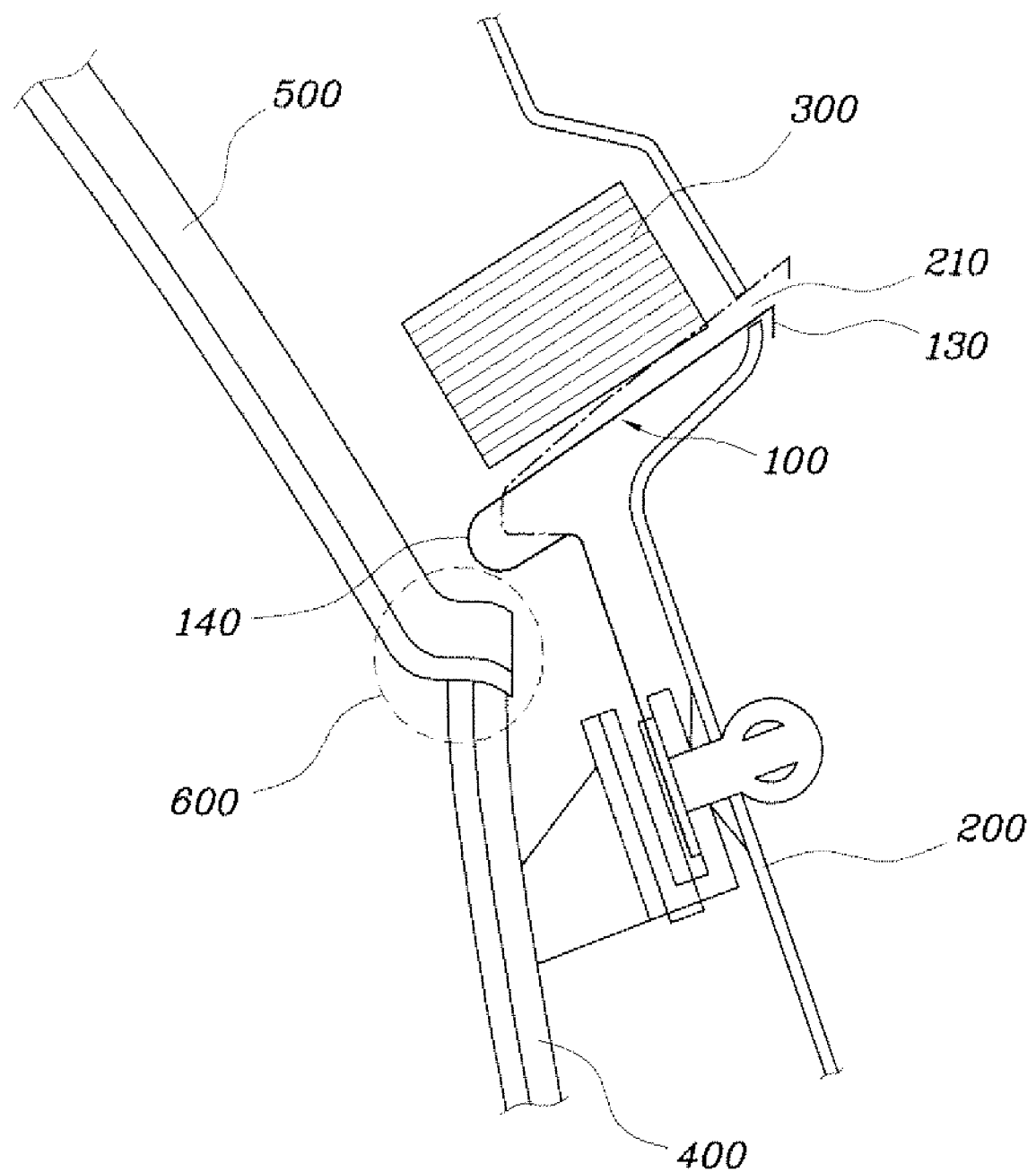
FIG. 3 is a cross-sectional view illustrating a ramp bracket assembly of an air bag for vehicles in accordance with still another embodiment of the present invention.

Referring to FIG. 3, in a third exemplary embodiment, an engagement groove 210 is defined in the inner panel 200, and an engagement portion 130 is provided on the ramp bracket 100 an removably engaged with the engagement groove 210. In this ramp bracket 100, when an impact occurs, the shock generated by the impact can be absorbed by the engagement portion 130 being disengaged from the engagement groove 210 of the inner panel 200, as illustrated by the phantom line in FIG. 3. The ramp bracket 100 has a curved portion 140 near the seam 600.

As is apparent from the above description, the present invention provides advantages in that ramp brackets can not only guide the deployment of a curtain air bag, but also absorb an external shock through the disengagement thereof.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A ramp bracket assembly for a vehicle air bag, configured to be mounted to an inner panel of a vehicle, comprising:
    a first ramp bracket comprising a first engagement portion; and
    a second ramp bracket comprising a second engagement portion removably engaged with the first engagement portion, and disengaged therefrom by a passenger's impact when the passenger's impact being more than a predetermined amount is applied to the first ramp bracket, such that the assembly absorbs shock and guides deployment of the air bag.

2. The ramp bracket assembly according to claim 1, wherein the first ramp bracket is configured to be deformed in the impact.

3. The ramp bracket assembly according to claim 1, wherein the first engagement portion comprises first saw teeth, and the second engagement portion comprises second saw teeth engaged with the first saw teeth.

4. A ramp bracket for a vehicle air bag, configured to be mounted to an inner panel of a vehicle, the inner panel comprising an engagement groove, the ramp bracket comprising:
    an engagement portion, removably engaged into the engagement groove, and disengaged therefrom by a passenger's impact when the passenger's impact being more than a predetermined amount is applied to the ramp bracket, such that the bracket absorbs shock and guides deployment of the air bag.

5. The ramp bracket assembly according to claim 4, wherein the ramp bracket is configured to be deformed in the impact.

6. The ramp bracket assembly according to claim 1, wherein the first ramp bracket includes a curved portion extending toward inside the vehicle with a predetermined length and deformable in receiving the passenger's impact.

7. The ramp bracket assembly according to claim 6, wherein the curved portion is disposed adjacent to a seam of a headlining and a pillar trim.

8. The ramp bracket assembly according to claim 4, wherein the ramp bracket includes a curved portion extending toward inside the vehicle with a predetermined length and deformable in receiving the passenger's impact.

9. The ramp bracket assembly according to claim 8, wherein the curved portion is disposed adjacent to a seam of a headlining and a pillar trim.

* * * * *